United States Patent [19]

Pucher

[11] Patent Number: 5,616,862
[45] Date of Patent: Apr. 1, 1997

[54] VOLUME METER

[75] Inventor: Hans-Jürgen Pucher, Unterweikertshofen, Germany

[73] Assignee: KEM Kuppers Elektromechanik GmbH, Karlsfeld, Germany

[21] Appl. No.: 490,951

[22] Filed: Jun. 15, 1995

[30] Foreign Application Priority Data

Nov. 11, 1994 [DE] Germany .............................. 9418104 U
Dec. 22, 1994 [DE] Germany .............................. 9420572 U

[51] Int. Cl.⁶ .................................................. G01F 3/04
[52] U.S. Cl. .................................................. 73/261
[58] Field of Search .................. 73/261, 272; 76/861.77; 277/235 B

[56] References Cited

U.S. PATENT DOCUMENTS

| | | | |
|---|---|---|---|
| 3,677,084 | 7/1972 | Masson et al. | 73/197 |
| 4,210,410 | 7/1980 | Ohtani | 73/261 |
| 5,027,653 | 7/1991 | Foran | 73/261 |
| 5,184,519 | 2/1993 | Ciarelli et al. | 73/261 |
| 5,275,043 | 1/1994 | Cotton | 73/261 |
| 5,382,029 | 1/1995 | Udagawa et al. | 277/235 B |

FOREIGN PATENT DOCUMENTS

393294A1  10/1990  European Pat. Off. .
3147208C2  8/1984  Germany .

*Primary Examiner*—Richard Chilcot
*Assistant Examiner*—Jewel V. Artis
*Attorney, Agent, or Firm*—Tilton, Fallon, Lungmus & Chestnut

[57] ABSTRACT

A volume meter or indicator in a multipart casing with a measuring chamber containing two meshing gears. For avoiding pockets the casing parts are sealed with a flat gasket instead of O-rings or other sealing means which cause pockets. In addition, the gears are placed on self-supporting spindles thereby avoiding a guidance or mounting on one side, and which results in a volume meter that can be cleaned with a minimum amount of time and solvent expenditure.

6 Claims, 1 Drawing Sheet

VOLUME METER

FIELD OF THE INVENTION

The invention relates to a volume indicator or meter in a multipart casing with a measuring chamber, in which are located two meshing gears.

BACKGROUND OF THE INVENTION

The function of such volume meters is to measure a volume flow. The measuring element thereof is driven by the liquid flow to be measured in accordance with the displacement principle of a gear motor. Pulses are produced by the teeth on moving past a tap hole. The sum of the pulses corresponds to the sum of the number of teeth travelling past the measuring point and is a measure for the volume flow to be measured.

Known volume meters or indicators operating according to the gear motor principle are preferably used for measurement purposes in the hydraulics industry. In the case of such instruments the gears are mounted in clearance-free, easily rotatable manner by a spindle inserted in the base part and in the top part. The two casing parts are sealed by an O-ring seal, which is inserted in a matching groove. The spindles are positioned by bearing bushes, which are fitted in the casing parts. The precise positioning of all the components is important for a high measuring accuracy of the instrument. The sensing of the speed is brought about by electronic sensors operating in contact-free manner and which art fitted to the outer circumference of the gears. The fixing of the electronic or optical pick-ups or taps usually takes place by means of holes.

Volume meters are particularly suitable for measuring a volume flow of a constant medium. When measuring different media, e.g. different varnishes or paints, considerable problems are encountered on changing between individual media. Known volume meters have pockets in which the media are deposited and can in part harden. The term pockets is here understood to mean the gaps and areas within the volume meter into which the medium to be measured can pass, but in which there is no continuous through-flow. On changing the measurement medium, such as is frequently the case in varnishing and painting installations, the residues present can contaminate the new measurement medium. In order to avoid this contamination of the measurement medium, on changing medium cleaning or washing cycles are performed for cleaning the measuring cell. In the case of known volume meters these washing cycles are time and solvent-intensive.

SUMMARY OF THE INVENTION

The object of the invention is to provide a volume meter in a multipart casing with a measuring chamber and in which are located two meshing gears, which has no pockets and can therefore be cleaned with a minimum time and solvent expenditure.

This object is achieved by using a flat gasket for sealing the casing parts.

According to another advantageous solution of the invention, the gears are rotatably positioned on self-supporting spindles and a flat gasket is provided for sealing the casing parts.

According to the basic principle of the invention the volume meter and in particular its measuring chamber should be constructed without pockets and other surfaces and areas in which the medium could be deposited. The pockets of the mounting support are minimized by self-supporting spindles. These spindles are rigid and only fixed on one side and require no guidance or mounting on the opposite side. Flat gaskets are used for sealing the casing parts, which avoids pockets, such as e.g. occur in the case of O-ring seals and the associated grooves.

According to an advantageous further development in the center of the gears are provided bearing bushes, whose height corresponds to or is only slightly larger than that of the gears. The gears are oriented in such a way that the surface thereof is parallel to and adjacent to the surface of the measuring chamber. Thus, pockets are avoided and friction between the gears and the measuring chamber surface is prevented by the slightly raised bearing bushes. Thus, a direct contact with the measuring chamber wall only takes place in the vicinity of the center of the gears, i.e. the bearing bushes.

The spindles advantageously have a step or shoulder, whose diameter substantially corresponds to that of the bearing bushes. This ensures the reliable retaining of the bearing bushes and therefore also the gears. This ensures a reliable guidance of the gears towards the side of the measuring chamber on which the spindles are fixed and an undesired friction is avoided.

Additionally, in the vicinity of the self-supporting end of the spindles it is possible to arrange stop or base plates in the casing. These base plates are made from a hardened material and are positioned substantially plane to the measuring chamber surface, their diameter substantially corresponding to that of the bearing bushes. Therefore the friction between the bearing bushes and the casing takes place on a clearly defined surface, so that a precise measuring process is ensured. Through the construction within the casing a planar, aligned design of the measuring chamber is obtained, so that no pockets are formed in which the medium to be measured could be deposited.

The materials of the stop or base plates and the bearing bushes are advantageously chosen in such a way that they form a sliding pair. In this way a low-wear contact and friction is obtained.

According to a preferred embodiment the height of the self-supporting spindles substantially corresponds to the height of the measuring chamber. For avoiding pockets the entire measuring chamber volume should be filled by gears. It is advantageous if the self-supporting spindles are also formed over the entire measuring chamber height and consequently the gears are guided throughout the area.

According to a further development of the invention the deposition and adhesion of the measuring medium on the components of the volume meter are prevented by a suitable surface coating. For this purpose the gears, the base plates, the spindles and the bearing bushes are coated with chromium nitride (CrN) or titanium nitride (TiN).

According to an advantageous embodiment the casing has a blind hole for receiving an electronic speed sensor, the end of the blind hole being spaced from the measuring chamber. This avoids any intervention in the measuring chamber and a planar measuring chamber wall not forming pockets is maintained. In the case of a Speed measurement which is based on a magnetic measuring principle, the measuring chamber material and in particular the wall between the blind hole and the measuring chamber should be made from a magnetically neutral material, i.e. with a relative permeability close to one.

Advantageously the shape of the flat gasket is adapted to the measuring chamber shape. However, it is also possible to have a through flat gasket into which are integrated the base plates. Advantageously the flat gasket has a clearly defined height substantially corresponding to the thickness of the gears in order to ensure a precise fitting of the gears into the measuring chamber so that the entire measuring chamber volume is filled by the gears. Thus, the height of the gasket will be of sufficient distance from the bottom of the measuring chamber to provide a measuring chamber having a thickness substantially corresponding to the thickness of the gears. For this purpose it is possible to use a rough pressed flat gasket, i.e., use a flat gasket manufactured such that it has an evenly-leveled surface.

According to an advantageous further development the casing is made at the most from two parts. Thus, only one instead of numerous surfaces has to be sealed, which helps to reduce the pockets.

A volume meter with this construction can be advantageously used for measurements, in which the measuring medium must be frequently changed and a contamination of the subsequently measured liquid must be prevented.

In the case of measuring tasks requiring a good washability of the volume meter, a volume meter according to the invention makes it possible to significantly reduce the washing time and the solvent consumption necessary for this.

BRIEF DESCRIPTION OF THE DRAWINGS

The invention is described in greater detail hereinafter relative to the drawings, wherein show.

DETAILED DESCRIPTION OF THE PREFERRED EMBODIMENT

Figure 1:
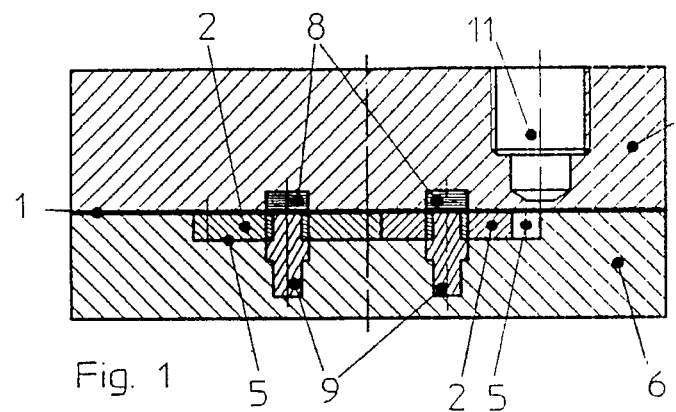
FIG. 1 A section through a volume meter in the plane of the mounting of the gears.

FIG. 1 shows a section through a volume meter or indicator in the plane of the mounting of the gears 2. The volume meter is constructed like a gear motor. The two gear halves 6, 7, which can also be referred to as a top and bottom, are sealed by a flat gasket 1. In the lower casing part 6 are fixed spindles 9 on which is in each case mounted by means of a bush 10 a gear 2. Within the casing 6, 7 is formed a measuring chamber 5 in which are located the gears 2. A running up of the gears 2 on the lower measuring chamber wall is prevented by a step or shoulder in the spindle 9. The running up of the gears 2 on the upper measuring chamber wall is prevented by stop or base plates 8 integrated into the upper casing part 7. In the upper casing part 7 is also provided a blind hole 11 close to the outside circle of one of the gears 2 to which can be fixed an electronic signal tap. The hole 11 has no connection with the measuring chamber 5 and consequently does not influence the washability or the measuring accuracy.

Figure 2:
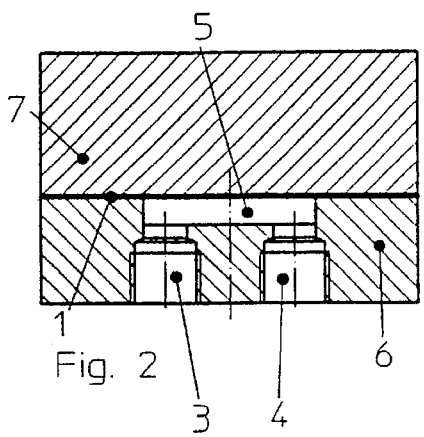
FIG. 2 A section through a volume meter in the plane of the inlet and outlet channels without gears.

FIG. 2 is a section through a volume meter in the plane of the inlet and outlet channels 3, 4 without gears. Both the inlet channel 3 and the outlet channel 4 are located in the lower casing part 6 and lead into the measuring chamber 5. Generally the function of the lower casing part 6, i.e. the bottom, is interchangeable with the function of the upper casing part 7, i.e. the top or cover. Thus, the inlet and outlet channels 3, 4, the mounting of the spindles or the supply of the blind hole 11 can take place both in the lower casing part 6 and in the upper casing part 7.

Figure 3:
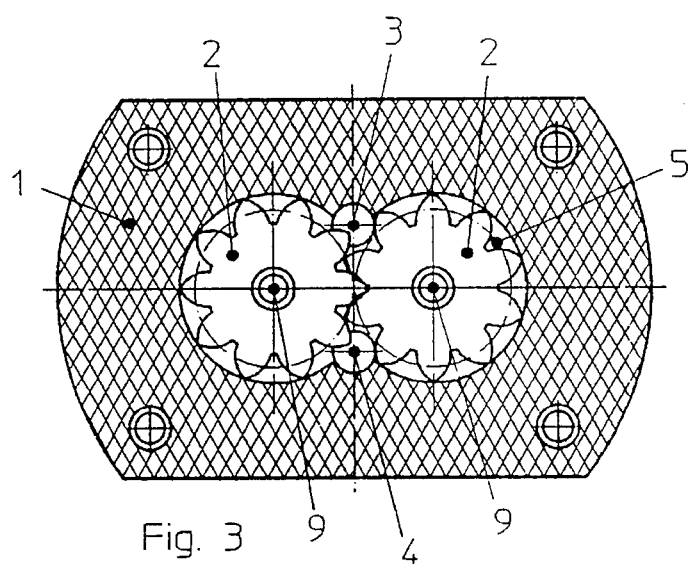
FIG. 3 A plan view of an opened volume meter with inserted flat gasket.

FIG. 3 is a plan view of an opened volume meter with inserted flat gasket 1. An inlet channel 3 and an outlet channel 4 are provided in the vicinity of the two meshing gears 2. The shape of the flat gasket 1 is adapted to the inlet and outlet channels 3, 4 and the measuring chamber 5.

Figure 4:
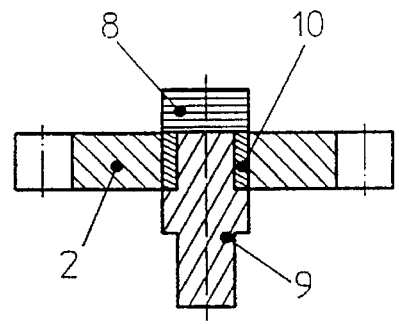
FIG. 4 A detail view of the gear mounting.

FIG. 4 shows a detail of FIG. 1, in which the spindle 9 is provided with a step, to prevent the running up of the gears onto the lower measuring chamber wall. A bush 10 is fixed to the spindle 9 and projects slightly upwards above and is in contact with the stop or base plate 8.

The parts shown in FIG. 4, i.e. the spindle 9, bush 10, gear 2 and base plates 8 are surface-coated with chromium nitride or titanium nitride in order to prevent adhesion of the medium to be measured. The gear 2 and bush 10 are appropriately jointly coated.

Figure 5:
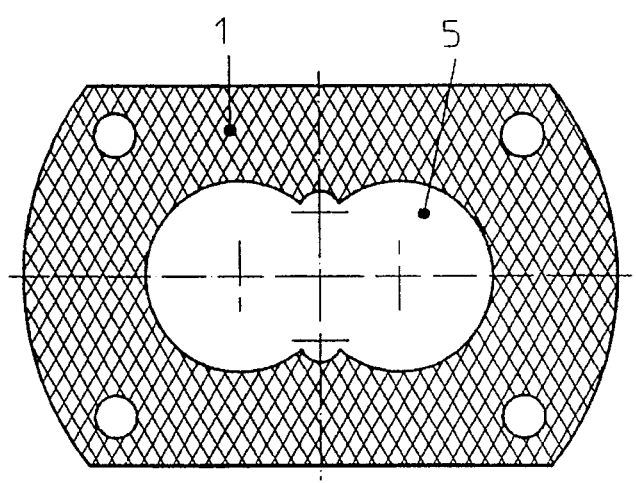
FIG. 5 A plan view of a flat gasket with a shaped measuring chamber.

FIG. 5 is a plan view of a flat gasket 1, which contains recesses for connecting screws and a recess in the form of the measuring chamber 5. However, it is also conceivable here to have a through flat gasket 1, but then the height of the gears would have to be different. In the case of the presently shown flat gasket it is important to know the distance between the bottom of the measuring chamber and gasket 1 in order to be able to dimension the gears in such a way that their top surface extends close to the surface of the upper casing part 7.

What we claim is:

1. Volume meter in a multipart casing (6, 7) with a measuring chamber (5) in which are located two meshing gears (2) substantially filling said measuring chamber (5), wherein said gears (2) are rotataby placed on self-supporting spindles (9) and a flat gasket (1) is provided for sealing the casing parts (6, 7), wherein in the center of the gears (2) are provided bearing bushes (10), whose height corresponds to or is slightly larger than that of the gears (2).

2. Volume meter according to claim 1, wherein the spindles (9) have a step, whose diameter substantially corresponds to that of the bearing bushes (10).

3. Volume meter according to claim 1, wherein in the vicinity of the self-supporting end of the spindles (9) base plates (8) are provided in the casing part (7), and the diameter of the base plates (8) substantially corresponds to that of the bearing bushes (10).

4. Volume meter according to claim 1, wherein in the vicinity of the self-supporting end of the spindles (9) base plates (8) are provided in the casing part (7), and the materials of the base plates (8) and the bearing bushes (10) form a sliding pair.

5. Volume meter according to claim 1, wherein the flat gasket (1) is rough pressed.

6. Volume meter in a multipart casing (6, 7) with a measuring chamber (5) in which are located two meshing gears (2) said meshing gears (2) substantially filling said measuring chamber (5), wherein said gears (2) are rotatably placed on self-supporting spindles (9), each of said self-supporting spindles including a self-supporting end, a base plate (8) provided in the vicinity of each of said self-supporting spindles (9) at said self supporting end, and a flat gasket (1) is provided for casing parts (6, 7).

* * * * *